Oct. 3, 1961 H. E. KOSS 3,003,042

TWO CAM INTERPULSE STATION IDENTIFYING DIAL

Filed Nov. 3, 1958

INVENTOR.
HOWARD E. KOSS
BY C. R. Sipes
ATTY.

United States Patent Office 3,003,042

Patented Oct. 3, 1961

3,003,042
TWO CAM INTERPULSE STATION IDENTIFYING DIAL

Howard E. Koss, Elmwood Park, Ill., assignor to Automatic Electric Laboratories, Inc., a corporation of Delaware Filed Nov. 3, 1958, Ser. No. 771,616
4 Claims. (Cl. 179—90)

This invention pertains to station identification in automatic telephone systems and particularly to a new and improved calling device for automatically identifying the calling station during the dialing of a called directory number.

The calling device of the present invention is intended for use with a system wherein the calling station is identified by means of a pulse impressed upon the line in a predetermined relationship to digital pulses which are indicative of the called party directory number. An example of this system is fully disclosed and described in U.S. Patent No. 2,366,647, issued January 2, 1945.

In the past, dial telephones of this class have incorporated two separate and distinct motivating mechanisms for the two pulse generating means. The first means generated pulses to indicate the directory number of the called station, and the second means identified the calling station. This, of course, required that the two pulsing means be synchronized and necessitated a very fine and critical manufacture and adjustment of the moving parts in the dial. Because of the intricacy of the mechanism, the dials of this type must necessarily be factory adjusted and are not adaptable to repair or conversion in the field.

Accordingly, it is a primary object of this invention to provide an improved calling device having a fixed relationship between the directory number pulse generating means and the calling station identifying pulse generating means.

Another object of this invention is to provide a calling device with adjustable means to selectively condition a calling-party identification means for operation between any two adjacent called-party identification pulses.

Another object of the invention is to provide a calling device which can be manufactured with normal manufacturing tolerances.

Still another object of this invention is to provide a calling device which can be converted in the field from a non-station identifying instrument to a station identifying device.

A still further object of this invention is to provide a calling device which is not dependent upon critical spring tensions for proper operation thereof.

These and other objects of this invention will be apparent to one skilled in the art from a reading of the following detailed description when read in conjunction with the drawings wherein.

Figure 1:
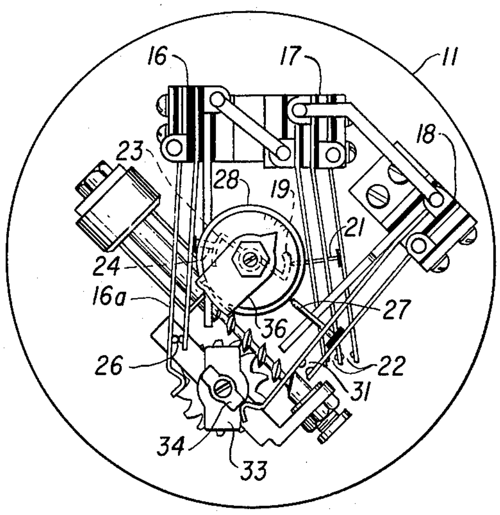
FIG. 1 is a plan view of a calling device incorporating this invention.
Figure 2:
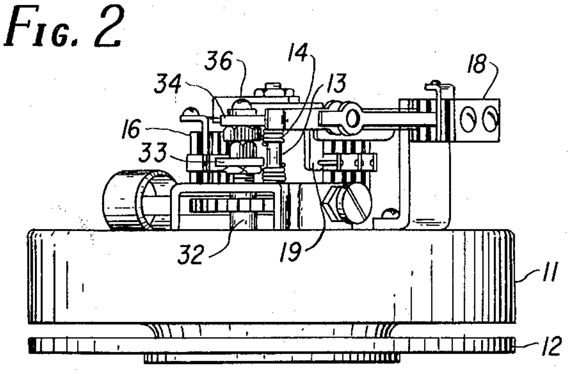
FIG. 2 is an elevational view of the setting device incorporating this invention.
Figure 4:
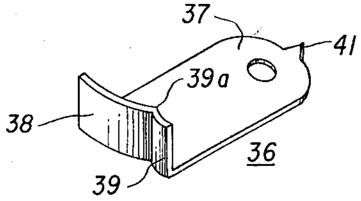
FIG. 4 is an enlarged view of the masking plate utilized in this invention.

Referring now to FIGS. 1 and 2, the calling device of this invention comprises a casing 11 and a setting device comprising a finger wheel or dial 12 fixed near one end of a rotatable arbor 13 in rotating spaced relationship to one face of the casing. The dial 12 is of the conventional type with finger holes therein for pulling the dial off-normal, and the arbor 13 has a coil spring 14 surrounding and fixed thereto for returning the arbor and dial to its home position. As in the well-known calling device, the return of the arbor to its position controls the output of digital impulses indicative of the called directory number.

The calling device includes a set of digital pulse springs 16, a set of off-normal springs 17, and a set of calling station-identification pulse springs 18. The arbor 13 carries a cam blade 19 associated with a cam follower 21 on the spring pile-up 17 which is effective to close the contacts 22 upon rotation of the arbor away from its home position, and a cam blade 23 similarly associated with a cam follower 24 for closing the pulse contacts 26 to complete the digital pulsing circuit to the telephone line which is not shown.

In the station identification pulsing means, the springs 18 have a cam follower 27 secured to one spring and normally engaged with a substantially circular cam 28 which is keyed to one end of the arbor for rotation therewith. The cam 28 has an indentation 29 formed in a predetermined peripheral position therein which permits the cam follower 27 sufficient movement at a predetermined portion of the dialing cycle to close the contacts 31.

The time of transmission of the identification pulse is established by the positioning of the circular cam 28 to place the indentation at a preselected position relative to the rotation of the digital pulse cam to condition the station identification pulsing circuit for operation at a predetermined time. In this manner, the pulse is generated between any two digital pulses and the calling station is identified by the position of the identification pulse relative to the digital pulses.

A cam shaft 32 is mechanically connected to the arbor 13 through suitable gearing to be rotated in timed relationship with the arbor and has a digital impulse cam 33 and a station identification impulse cam 34 keyed for rotation therewith. The digital impulse cam 33 is placed on the shaft 32 in a position that the locus of its outer extremities encompasses the normal closed position of one blade 16*a* of the digital impulse spring pile-up 16 so that rotation of the cam 33 opens the contacts of the spring pile-up 16 in predetermined relation to the movement of the dial 12 and the arbor 13 to transmit the digital pulses to a telephone line. The second impulse cam 34 is similarly associated with the identification impulse spring pile-up 18 and is fixed in an angular position in predetermined relationship to the cam 33 so that the identification pulse is sent in a positive predetermined relationship to the digital dialing pulses.

Figure 3:
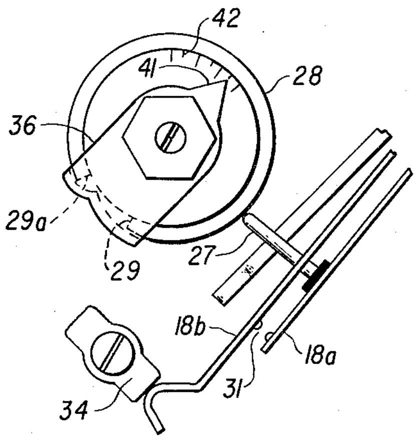
FIG. 3 is an enlarged view of the circular off-normal cam and contact control of this invention.

Referring now to FIG. 3, a masking plate 36 is secured to the arbor 13 in limited rotational relationship to the circular cam 28. The masking plate 36 is formed of sheet metal or other suitable material and comprises a base plate 37 and two intersecting arcuate portions 38 and 39 which are substantially perpendicular to the base plate 37 and form a masking portion at the periphery of the circular cam 28. An indicating arrow 41 is formed at one end of the masking plate to aid in installation. By aligning the indicator 41 with indicia 42 inscribed on the face of the cam, an installer in the field will position the masking plate in proper relationship to the indentation in the periphery of the cam. The arc 38 of the masking plate is of substantially the same radius as that of the periphery of the cam 28 so that when the arbor and the cam are rotated in a counterclockwise direction (FIG. 3), the cam follower 27 first engages the edge of 38 to move 37 to masking position over 29 and then rides up onto the masking plate instead of into the indentation 29 thereby holding the contact blade 18*a* of the identification of pulse spring pile-up 18 out of possible contact with the contact blade 18*b* of the pile-up during the pulling of the dial off normal. The intersection point of the arcuate portions 38 and 39 forms a brake-ridge 39*a* which prevents movement of the masking plate in a clockwise direction relative to the circular cam 28 after it contacts the shoulder 29*a* of the indentation 29 and permits the cam follower to ride over the second arcuate portion without any relative movement between the two. As the arbor and the circular cam 28 rotate clockwise to return to their home position, the cam follower 27 contacts the forward edge of the smaller arc 39, which is of sufficiently different radius than the cam 28 to present a working surface against which the cam follower operates, to pivot the masking plate away from the indentation 29. The cam follower 27 is thereby permitted to move into the identation and condition the spring 18*a* for closure of the contacts 31 by the identification impulse cam 34. The cam 34 is rotated by suitable mechanism as heretofore described to contact the blade 18*b* and close the contacts 31 once during a period that the springs are conditioned for closure by cooperation of the indentation 29 with the cam follower 27.

In this manner, the identification pulse can be sent only at a selected predetermined point in the dialing cycle as controlled by the peripheral location of the indentation 29, and the pulse is positively located between the digital directory pulses by the fact that the identification pulsing cam 34 and the digital pulsing cam 33 are on the same shaft and in fixed relative positions. With the fixed relative position of the two cams, it is, of course, impossible for the two pulses to overlap one another.

While this device has been illustrated in a particular embodiment, it should be understood that various modifications may be made therein without departing from the spirit and scope of this invention.

What is claimed is:

1. In an automatic telephone system having a calling-party identification circuit and a setting device variably rotatable from and returnable to a home position in accordance with the digital directory number for controlling a called-party generating means including a cam shaft having a first cam rotated therewith in accordance with the return of said setting device to generate a pulse in a circuit in a predetermined time sequence indicative of the selected called party, an automatic calling-party identification circuit control means comprising: a second cam rotatable with said setting means, said second cam being circular and having an indentation along a predetermined portion of the periphery thereof; switch means in said calling-party identification circuit, said means including contacts having a cam follower associated therewith riding on the periphery of said circular cam to condition said switch means for operation when said follower is in said indentation; masking means for preventing the entrance of said cam follower into the indentation in said circular cam during the rotation of said setting means away from its home position; and means operable by said cam shaft for operating said switch means during its conditioned period whereby a calling-party identification pulse is generated only at a predetermined point in said return cycle in a predetermined time relationship to said called-party identification pulse.

2. In an automatic telephone system having a calling-party identification circuit and a setting device variably rotatable from and returnable to a home position in accordance with a digital directory number for controlling a called-party pulse generating means including a cam shaft having a first cam rotated in accordance with the return of said setting device to pulse a circuit in a predetermined time sequence indicative of a directory number, automatic calling-party identification circuit control means comprising: a circular cam rotatable with said setting means, said cam having an indentation at a predetermined point on its periphery; switch means in said calling-party identification circuit; a cam follower riding on the periphery of said circular cam associated with one contact for conditioning said switch means for operation during the time that said follower is in said indentation; an arcuate masking plate positioned over said indentation in said cam, said masking plate being rotatable in one direction only away from said indentation whereby said cam follower is not permitted to enter said indentation during the rotation of said setting device away from its home position; and a third cam fixed on said cam shaft in predetermined angular relationship to said first cam for operating said switch means during its conditioned period, whereby an identification pulse is generated only at a predetermined point in the return cycle and in a predetermined relationship to said called-party identification pulse.

3. In an automatic telephone system, a dial of the type having a finger plate mounted on an arbor, a spring for returning said arbor towards its normal position upon release of said finger plate, a contact for transmitting dial impulses indicative of the destination of the call, a cam shaft carrying cam means cooperating with said dial impulse contact, said cam shaft being coupled to said arbor for rotation during the return movement only of said finger plate, and having calling-party identification contact means actuable in the interval between successive actuations of said dial impulse contact; said dial also comprising two cams cooperating with said identification contact means, the first of said cams being mounted on said arbor in engaging relationship to said identification contact means so as to precondition said contact means for actuation within a desired angular range of motion of said arbor, and the second of said cams being mounted on said cam shaft in a predetermined angular relation to said cam means and engaging said identification contact means for completing the actuation of said contact means.

4. In an automatic telephone system, a dial of the type having a finger plate mounted on an arbor, a spring for returning said arbor towards its normal position upon release of said finger plate, a pair of contact springs for transmitting dial impulses indicative of the destination of the call, a cam shaft carrying cam means cooperating with one of said dial impulse springs, said cam shaft being coupled to said arbor for rotation during the return movement only of said finger plate, and also having a pair of calling-party identification contact springs actuable in the interval between successive actuations of said dial impulse springs; said dial also comprising two cams cooperating with said identification springs, the first of said cams being mounted on said arbor and engaging the first of said identification springs within a desired angular range of motion of said arbor for moving it toward the second identification spring, thereby to prepare the closure of said identification contact within said range, and the second of said cams being mounted on said cam shaft in a predetermined angular relation to said cam means and engaging said second identification spring for completing the closure of said contact.

References Cited in the file of this patent

UNITED STATES PATENTS

| | | |
|---|---|---|
| 2,410,520 | Ostline | Nov. 5, 1946 |
| 2,581,697 | Ostline | Jan. 8, 1952 |